Sept. 4, 1956      D. C. WILLIAMS      2,761,307
STOPER TESTING APPARATUS
Filed Sept. 15, 1954
2 Sheets-Sheet 1
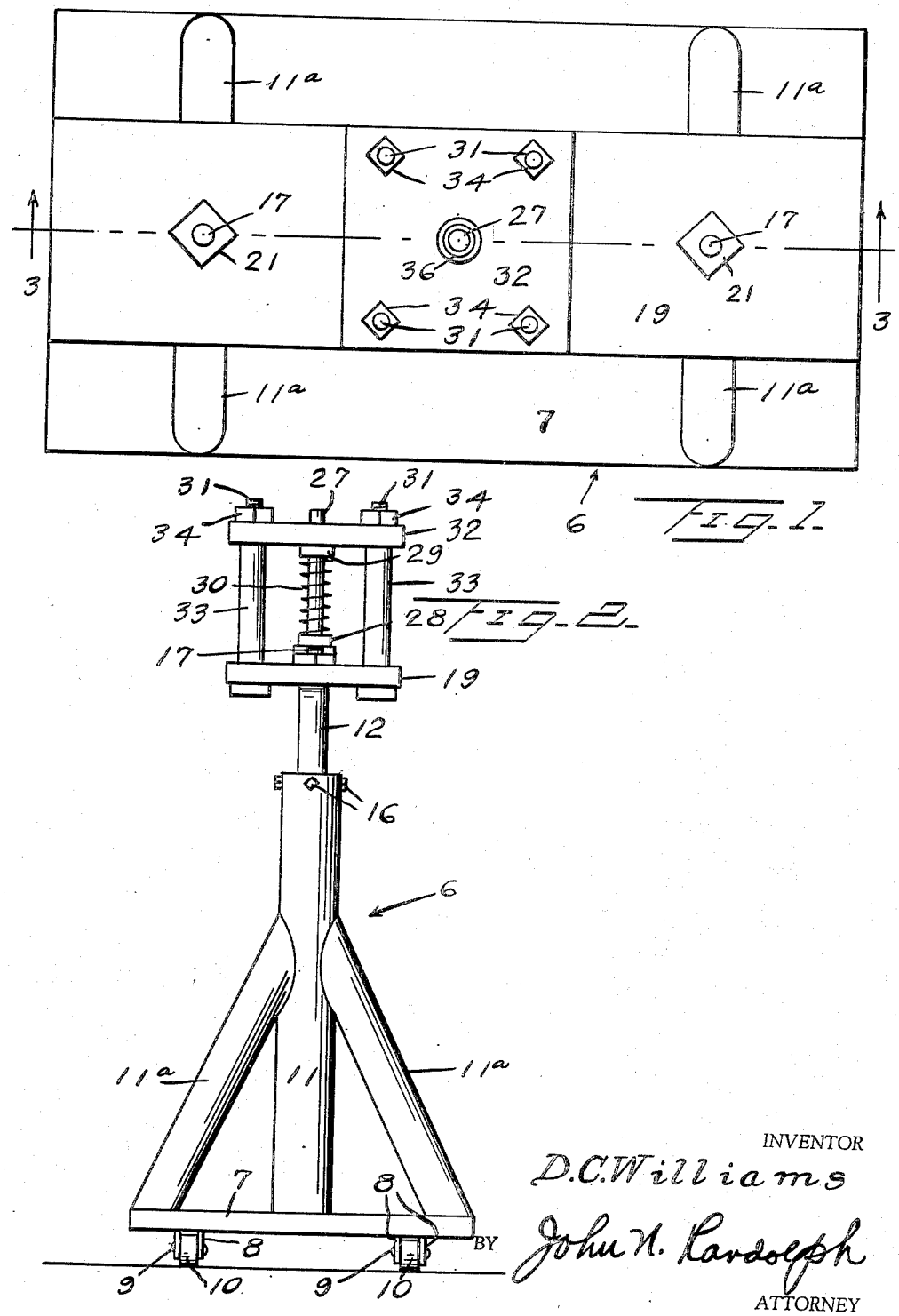
INVENTOR
D. C. Williams
BY John N. Randolph
ATTORNEY

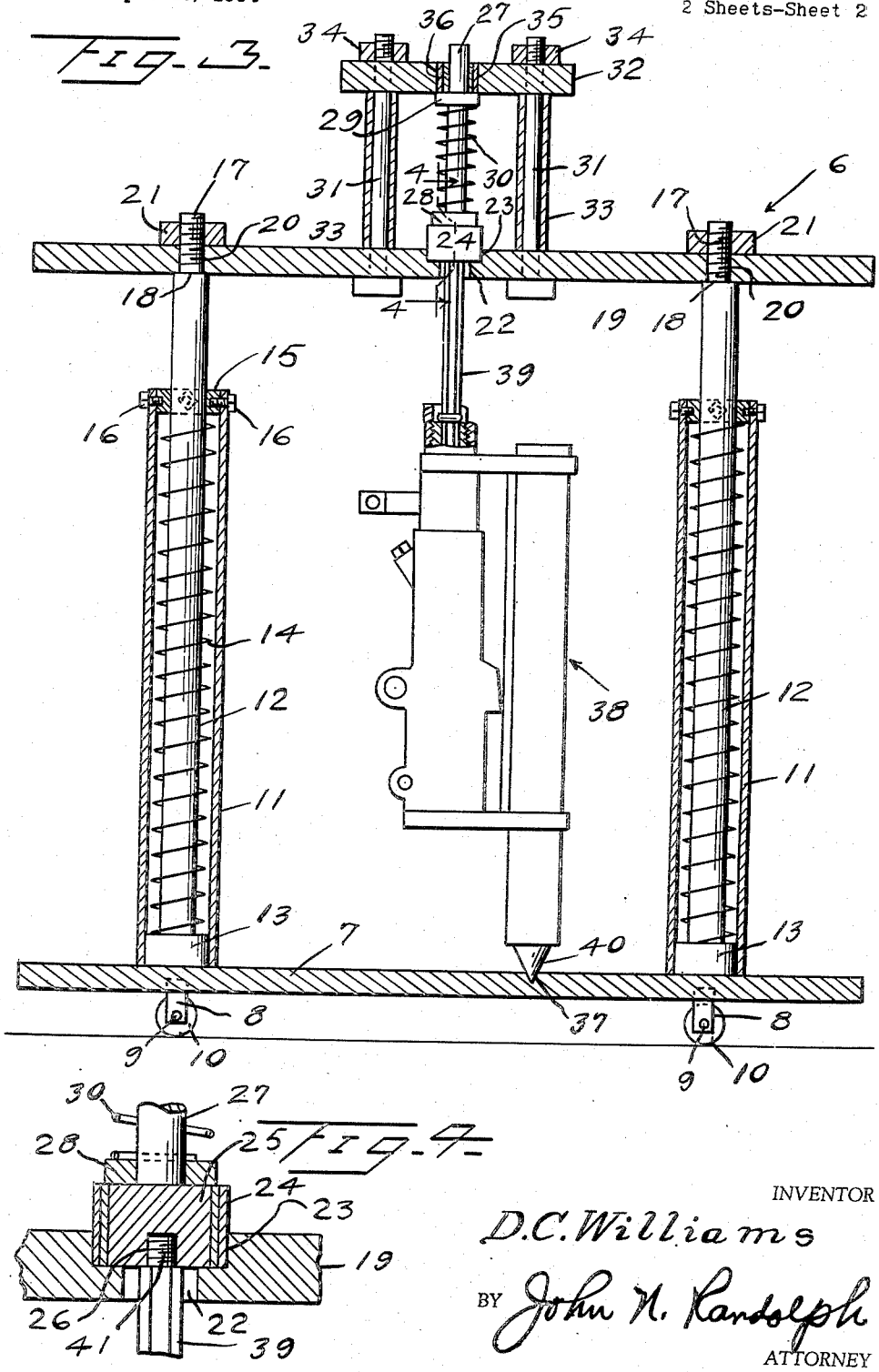

United States Patent Office 2,761,307
Patented Sept. 4, 1956

2,761,307

STOPER TESTING APPARATUS

Donald C. Williams, Kimball, W. Va.

Application September 15, 1954, Serial No. 456,157

4 Claims. (Cl. 73—11)

This invention relates to a novel apparatus of extremely simple construction for testing stopers or hammer drills used in mining for the purpose of determining whether or not a stoper being tested is operating correctly.

Another object of the invention is to provide an apparatus for testing stopers which will test both the pressure of the pneumatic jack of the stoper and also the rotation of the stoper plunger simultaneously for indicating, in a defectively operating stoper, whether the operational failure is in the pneumatic jack or the rotatably driven plunger.

Another object of the invention is to provide a testing apparatus which is readily portable, which is composed of a minimum number of parts, which may be readily assembled and dismantled, and which will be extremely efficient and durable in use.

Various other objects and advantages of the invention will hereinafter become more fully apparent from the following description of the drawings, illustrating a presently preferred embodiment thereof, and wherein:

Figure 1 is a top plan view of the testing apparatus;

Figure 2 is an end elevational view thereof, on a reduced scale;

Figure 3 is a longitudinal sectional view taken substantially along a plane as indicated by the line 3—3 of Figure 1, and Figure 4 is an enlarged fragmentary vertical sectional view taken substantially along a plane as indicated by the line 4—4 of Figure 3.

Referring more specifically to the drawings, the testing apparatus in its entirety and comprising the invention is designated generally 6 and includes a substantially flat elongated and relatively wide platform 7 comprising a base for the apparatus 6. The platform or base 7 is provided with longitudinally and transversely spaced pairs of depending wheel forks 8 through each of which pairs of forks extends an axle 9 on which a supporting wheel or roller 10 is journalled. The axles 9 are disposed transversely of the platform 7 and the axles, located adjacent each end of said platform, are preferably disposed in transverse alignment. The four wheels 10 are located near to but spaced from the four corners of the platform 7 and are adapted to engage a supporting surface to provide a mobile support for the apparatus 6.

A pair of corresponding cylinders 11 have lower ends disposed on and secured to the platform or base 7 and extend upwardly therefrom. The cylinders 11 are disposed perpendicular to the base 7 and are equally spaced from the side edges thereof and are located adjacent the ends of said base. Each cylinder 11 may be braced relative to the base 7 by two diagonal braces 11a having lower ends secured to the base and upper ends secured to the cylinder substantially midway of the cylinder ends. A plunger rod 12 is loosely disposed in each cylinder 11 and has a head 13 at its lower end of larger cross sectional size than the plunger rod. The heads 13 have a close fitting working engagement in the cylinders 11 and normally rest upon portions of the base 7 surrounded by the lower ends of said cylinders. An expansion coiled spring 14 is loosely disposed around each rod 12 and within the cylinder 11 thereof and has a lower end bearing against the upper end of the head 13 of said rod. Each rod 12 extends slidably through a collar 15. The collars 15 fit into the open upper ends of the cylinders 11 and are detachably secured therein by a plurality of screw fastenings 16 which extend inwardly through the cylinders 11 and which are threaded radially into the collars 15. The upper ends of the springs 14 bear against the undersides of the collars 15 and are maintained thereby under tension between said collars and the heads 13. The rods 12, above and spaced from the collars 15, are provided with reduced threaded upper ends forming stems 17 and defining annular upwardly facing shoulders 18, disposed around the lower ends of said stems.

A plate 19 is supported by the rods 12 and is provided with openings 20 through which the threaded stems 17 extend and which are of smaller diameter than the rods 12 so that portions of the plates 19, surrounding said openings 20, rest upon the rod shoulders 18 for supporting the plate 19 thereon. The openings are preferably spaced equal distances from the ends and side edges of the plate 19 for locating said plate in a centered position over the base 7. A nut 21 engages the upper end of each threaded stem 17 and is tightened against the upper side of the plate 19 for securing the plate to the rods 12. The plate 19 is provided with an opening 22 which is disposed between, in alignment with and equally spaced from the openings 20 and which is provided with an enlarged upwardly opening upper portion 23, as best seen in Figure 4.

Said portion 23 provides a seat or socket for a lower sleeve bearing 24 which is supported therein and extends upwardly therefrom. A chuck 25 is journalled in the bearing 24 and is of larger diameter than the bottom opening 22. The chuck 25 has a downward opening threaded socket 26 which is centrally disposed relative thereto and to the opening 22 and which is smaller in diameter than said opening 22. The chuck 25 has a spindle 27 fixed to and extending upwardly therefrom. A lower washer 28 is mounted around the lower end of the spindle 27 and against the upper end of the chuck 25 and an upper washer 29 is disposed around the spindle 27 near to but spaced from its upper end. An expansion coiled spring 30 is loosely disposed around the spindle 27 and has its ends bearing against the washers 28 and 29.

Four headed bolts 31 extend upwardly through the plate 19 and are disposed around and equally spaced from the opening 22. The bolts 31 extend upwardly through a top plate 32, adjacent the four corners thereof. A spacing sleeve 33 is mounted on each bolt 31 between the plates 19 and 32, and a nut 34 engages the threaded upper end of each bolt 31 and bears on the upper side of the plate 32. Thus, the nuts 34 cooperate with the bolts 31 and sleeves 33 for securing the top plate 32 in a fixed position above and spaced from the plate 19. The top plate 32 is provided with a central opening 35 which is aligned with the opening 22, 23 and which contains a bearing 36 in which the upper portion of the spindle 27 is journalled. The upper washer 29 engages against the underside of the bearing 36 and plate 32 for maintaining the spring 30 under tension. The base 7 is provided with an upwardly opening conical socket 37 which is offset from the openings 35 and 22, 23.

A conventional stoper or hammer drill of the type used for mining and designated generally 38, is shown applied to the apparatus 6 to be tested thereby. The stoper or hammer drill 38 constitutes a conventional pneumatic tool having a plunger 39 which is extended upwardly and rotated when compressed air is supplied to said tool 38. The stoper 38 has a conical base end 40 which is offset from the axis of the plunger 39 and which seats in the upwardly opening socket 37 and when so disposed, the plunger 39 can be positioned in alignment with the axis of the chuck 25 and with the tool 38 in an upright position. The plunger 39 is of a cross sectional size to fit loosely in the opening 22 and is provided with a reduced threaded upper end 41 which is threaded into the chuck socket 26, as seen in Figure 4, when the plunger 39 is turned in its normal direction of rotation.

With the stoper or hammer drill 38 thus mounted in the apparatus 6, as illustrated in Figure 3, compressed air is supplied in a conventional manner to the tool 38 for extending the plunger 39 thereof upwardly from its position of Figure 3 and for rotating the plunger. When this occurs, if the stoper or hammer drill is operating correctly, the upward thrust exerted by the plunger 39 will force the plate 19 and the parts carried thereby upwardly with respect to the base 7, causing the rods 12 to move upwardly in the cylinders 11 and causing the upwardly moving rod heads 13 to further compress the springs 14 between said heads 13 and the guide collars 15. At the same time, the plunger 39 will be rotated and accordingly will revolve the chuck 25 and its spindle 27. The compressed spring 30 will resist upward displacement of said chuck 25 and spindle 27 relatively to the plates 19 and 32 and in combination with the washers 28 and 29 will resist rotation of the chuck and spindle, so that rotation of the plunger 39 relative to the remainder of the tool 38 will require a torque substantially equal to that required in the normal use of the tool to cause the plunger 39 to revolve and rotate the chuck 25 and spindle 27. Thus, upward movement of the plate 19 and parts supported thereon and rotation of the spindle 27 will visually indicate if the tool 38 is operating properly.

The apparatus 6 will also indicate a partial defective operation of the tool 38. For example, should the plate 19 be extended upwardly without the spindle 27 being rotated this will indicate an operational failure in the mechanism part of the tool by which a rotary driving force is imparted to the plunger. Should the plunger 39 revolve but the plate 19 not be raised relative to the base 7, this will indicate an operational failure in the pneumatic cylinder or jack.

Various modifications and changes are contemplated and may obviously be resorted to, without departing from the spirit or scope of the invention as hereinafter defined by the appended claims.

I claim as my invention:

1. A testing apparatus for testing a stoper having a plunger comprising a substantially flat base, cylinders fixed to and rising from said base in spaced apart relation to one another, rods slidably disposed in said cylinders and provided with headed lower ends slidable in the cylinders, spring means contained in said cylinders bearing on the rod heads for urging the rods downwardly and toward the base, a lower plate secured to upper portions of said rods and supported thereby above the upper ends of the cylinders and substantially parallel to the base, a top plate, means supporting said top plate above the lower plate substantially parallel thereto and spaced therefrom, said lower plate and top plate having aligned bearings, a chuck journalled in the lower plate bearing, a spindle fixed to and extending upwardly from the chuck and journalled in said top plate bearing, means resisting rotation of the chuck and spindle within said bearings, said base being adapted to detachably support thereon a base end of a stoper, and said chuck having downward opening means adapted for detachably coupling the chuck to the upper end of the stoper plunger, said lower plate and the parts carried thereby being displaced upwardly relative to the base when the plunger is extended by compressed air supplied to the stoper and said chuck and spindle being rotated in the bearings by rotation of the stoper plunger.

2. An apparatus as in claim 1, collars disposed in the upper ends of the cylinders and through which said rods slidably extend, means detachably securing said collars to the upper ends of said cylinders, and said spring means comprising expansion coiled springs disposed in said cylinders between the rod heads and said collars.

3. An apparatus as in claim 1, said means resisting rotation of the chuck and spindle comprising washers mounted on the spindle between the chuck and the bearing of said top plate, and an expansion coiled spring disposed around the spindle between and bearing against said washers.

4. A testing apparatus for testing a hammer drill having a plunger comprising a base, rod members extending upwardly from said base, a plate secured to and supported by said rod members above and substantially parallel to the base, guide means in which said rod members are reciprocably disposed for movement of the rod members and said plate toward and away from the base, spring means contained in said guide means and urging the rod members and plate downwardly and toward the base, a lower bearing supported in said plate, a chuck journalled in said lower bearing, a spindle fixed to and extending upwardly from said chuck, an upper bearing in which said spindle is journalled, a bearing support in which said upper bearing is mounted, connecting means connecting said bearing support to the plate and supporting the bearing support above and spaced from the plate, said chuck having downwardly opening coupling means adapted to couple the chuck to an outer end of a hammer drill plunger, said base supporting an opposite end of the hammer drill, and means carried by the chuck and spindle for resisting rotation thereof in said bearings.

References Cited in the file of this patent

UNITED STATES PATENTS

| 1,375,604 | Olsen | Apr. 19, 1921 |
| 1,576,465 | Pryce | Mar. 9, 1926 |
| 1,750,415 | Marsh | Mar. 11, 1930 |
| 1,790,971 | Broszeit | Feb. 3, 1931 |
| 2,310,974 | Lumm | Feb. 16, 1943 |

FOREIGN PATENTS

| 820,977 | Germany | Nov. 15, 1951 |